United States Patent
Takemura et al.

(10) Patent No.: US 11,454,986 B2
(45) Date of Patent: Sep. 27, 2022

(54) VEHICLE, OPERATION MANAGEMENT DEVICE, OPERATION MANAGEMENT METHOD, AND COMPUTER-READABLE RECORDING MEDIUM

(71) Applicant: TOYOTA JIDOSHA KABUSHIKI KAISHA, Toyota (JP)

(72) Inventors: Kazuaki Takemura, Nagoya (JP); Makoto Matsushita, Ichinomiya (JP); Tae Sugimura, Miyoshi (JP); Hideo Hasegawa, Nagoya (JP); Tomoaki Umeki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 137 days.

(21) Appl. No.: 16/858,923

(22) Filed: Apr. 27, 2020

(65) Prior Publication Data
US 2020/0356111 A1    Nov. 12, 2020

(30) Foreign Application Priority Data
May 8, 2019  (JP) .............................. JP2019-088389

(51) Int. Cl.
*G05D 1/02*   (2020.01)
*G05D 1/00*   (2006.01)
*G06V 20/56*  (2022.01)

(52) U.S. Cl.
CPC ......... *G05D 1/0293* (2013.01); *G05D 1/0027* (2013.01); *G06V 20/588* (2022.01); *G05D 2201/0213* (2013.01)

(58) Field of Classification Search
CPC ............... G05D 1/0293; G05D 1/0027; G05D 2201/0213; G06K 9/00798
See application file for complete search history.

(56) References Cited

U.S. PATENT DOCUMENTS

| 6,198,386 | B1* | 3/2001 | White, II | H04N 7/181 348/E7.086 |
| 2004/0172194 | A1 | 9/2004 | Muramatsu et al. | |
| 2006/0187010 | A1* | 8/2006 | Berman | B60Q 1/50 340/932.2 |
| 2009/0306852 | A1 | 12/2009 | Ikeda et al. | |
| 2010/0256852 | A1* | 10/2010 | Mudalige | G08G 1/22 701/24 |

(Continued)

FOREIGN PATENT DOCUMENTS

| CN | 102371937 A | 3/2012 |
| CN | 104071074 A | 10/2014 |
| CN | 106696962 A | 5/2017 |

(Continued)

*Primary Examiner* — Alan D Hutchinson
*Assistant Examiner* — Andy Schneider
(74) *Attorney, Agent, or Firm* — Oliff PLC

(57) ABSTRACT

A vehicle is configured to be capable of traveling on a road, and includes: a control unit that controls each unit constituting the vehicle; and a projection unit that is capable of projecting an image on the road by control from the control unit, and the projection unit projects a road marking on the road. The road marking is a crosswalk or a marking for traveling of a particular vehicle. The vehicle further includes a traffic signal unit that selectively outputs a color of at least two different colors by control from the control unit.

7 Claims, 11 Drawing Sheets

(56) References Cited

U.S. PATENT DOCUMENTS

2012/0044090 A1    2/2012  Kahler et al.
2020/0001779 A1*   1/2020  Alexander ......... G06K 9/00825

FOREIGN PATENT DOCUMENTS

| JP | H05-058218 A  | 3/1993  |
|----|---------------|---------|
| JP | H09-91589 A   | 4/1997  |
| JP | 2001-266286 A | 9/2001  |
| JP | 2004-265031 A | 9/2004  |
| JP | 2008-007079 A | 1/2008  |
| JP | 2009-157794 A | 7/2009  |
| JP | 2009-298360 A | 12/2009 |

* cited by examiner

FIG. 9A
FIG. 9B
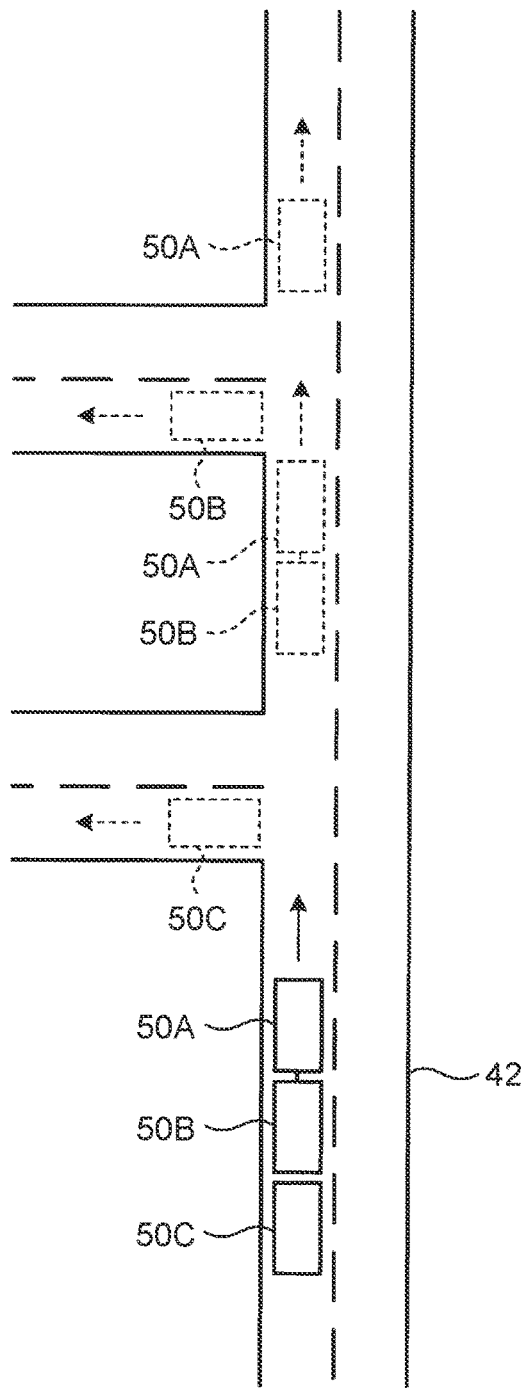
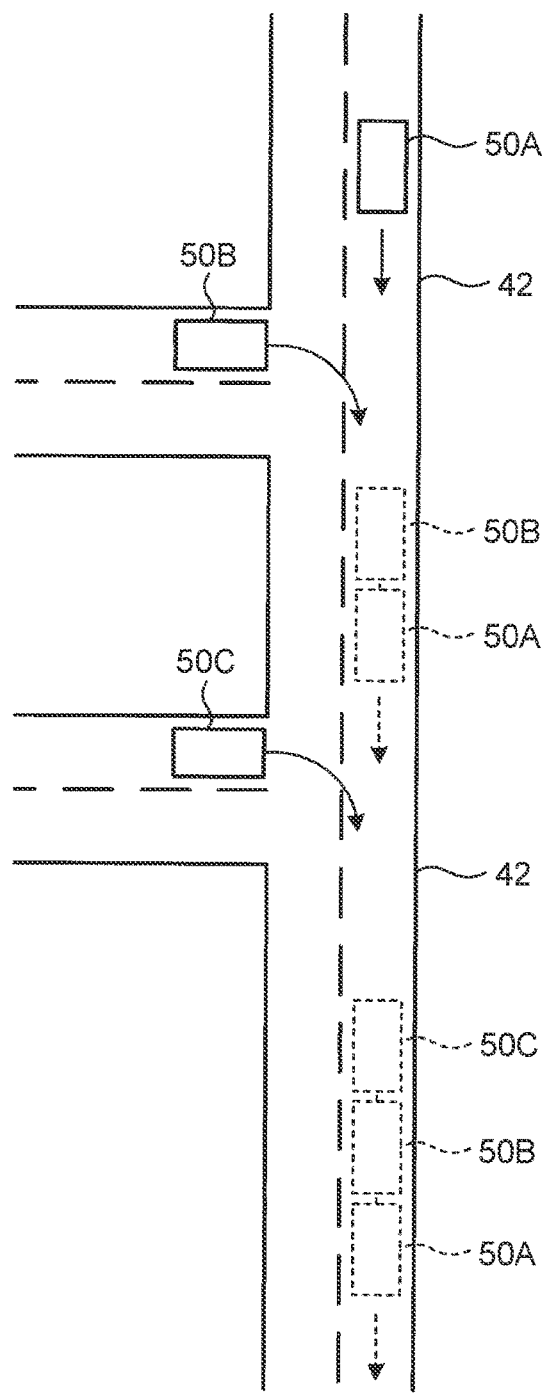

VEHICLE, OPERATION MANAGEMENT DEVICE, OPERATION MANAGEMENT METHOD, AND COMPUTER-READABLE RECORDING MEDIUM

INCORPORATION BY REFERENCE

The disclosure of Japanese Patent Application No. 2019-088389 filed on May 8, 2019 including the specification, drawings and abstract is incorporated herein by reference in its entirety.

BACKGROUND

1. Technical Field

The disclosure relates to a vehicle, an operation management device, an operation management method, and a computer-readable recording medium.

2. Description of Related Art

Japanese Patent Application Publication No. 2001-266286 discloses a vehicle operation system in which stations are provided along an exclusive road on which vehicles can form an array, vehicles drive between the exclusive road and a general road, and passengers transfer at stations. The vehicle operation system is provided with a central operation control device including array traveling determination means for deciding an array traveling depending on whether the number of passengers exceeds a capacity, destination decision means for deciding a destination station of the vehicles forming the array traveling and the number of necessary vehicles from getting-on or getting-off stations of passengers and the number of passengers after the decision of the array traveling, and traveling road decision means for deciding a traveling on the exclusive road or general road as a traveling road for a station arrival vehicle based on the number of passengers on the exclusive road and the number of passengers on the general road after the vehicles forming the array traveling arrives at the destination station and a vehicle from the general road arrives at the destination station.

SUMMARY

However, in the above-described background art, the securement of safety for a using person such as an occupant in a vehicle such as a bus has not been discussed. Particularly, in the case of the bus or the like, there is a fear of an accident with another vehicle traveling from behind the bus after the using person gets off the bus. Therefore, there has been demanded a technology that allows the improvement of the safety for the using person that uses the vehicle. Further, in the use of the vehicle such as the bus, there has been demanded a technology that allows the using person to arrive at a desired destination by a flexible operation on a general road and that improves the convenience for the using person.

The disclosure has been made in view of the above circumstance, and an object of the disclosure is to provide a vehicle that allows the improvement of the safety for the using person that uses the vehicle. Another object of the disclosure is an operation management device, an operation management method and a computer-readable recording medium that make it possible to flexibly operate the vehicle with the improved safety for the using person of the vehicle, on a general road, and that improve the convenience of the vehicle for the using person.

For solving the above-described problem and achieving the above objects, a vehicle according to an aspect of the disclosure is a vehicle configured to be capable of traveling on a road, the vehicle including: a control unit that controls each unit constituting the vehicle; and a projection unit that is capable of projecting a road marking on the road by control from the control unit.

The road marking may be a crosswalk or a marking for traveling of a particular vehicle. For example, the marking for traveling of a particular vehicle is a bus lane or a bus priority lane. Thereby, in the case where the vehicle is a bus on which many occupants ride, the driver of another general vehicle that is traveling behind the bus easily recognizes that the lane on which the general vehicle is traveling is a bus lane or a bus priority lane, and therefore, the possibility that the vehicle such as a bus is caught in a congestion or the like is reduced. Further, when the road marking is a crosswalk, the driver of another general vehicle recognizes that there is a crosswalk near the vehicle such as a bus. Therefore, for example, even in the case where a using person having got off the vehicle crosses a road near the vehicle, it is possible to significantly reduce the possibility of occurrence of a collision accident with another following vehicle.

The vehicle may further include a traffic signal unit that selectively outputs a color of at least two different colors by control from the control unit. With this configuration, the driver of another general vehicle that is traveling behind the vehicle easily recognizes that there is a pedestrian near the vehicle, and therefore, it is possible to further reduce the possibility of the occurrence of the collision accident with the following vehicle.

An operation management device according to an aspect of the disclosure includes a memory, and a processor including hardware, in which: the processor acquires position information about each of a plurality of vehicles, the position information being sent from each of the plurality of vehicles, the plurality of vehicles including the vehicle according to the above disclosure; and the processor outputs a union instruction signal based on the acquired position information, and sends the union instruction signal to each of the plurality of vehicles, the union instruction signal being a signal with which formation and separation of an array constituted by the plurality of vehicles are controlled.

An operation management method according to an aspect of the disclosure is an operation management method that is executed by an operation management device, the operation management method including: acquiring position information about each of a plurality of vehicles, the position information being sent from each of the plurality of vehicles, the plurality of vehicles including the vehicle according to the above disclosure; and reading the acquired position information from a memory, outputting a union instruction signal, and sending the union instruction signal to each of the plurality of vehicles, the union instruction signal being a signal with which formation and separation of an array constituted by the plurality of vehicles are controlled.

A computer-readable recording medium according to an aspect of the disclosure is a computer-readable recording medium storing a program causing an operation management device to execute: acquiring position information about each of a plurality of vehicles, the position information being sent from each of the plurality of vehicles, the plurality of vehicles including the vehicle according to the above disclosure; and reading the acquired position information from a memory, outputting a union instruction signal, and sending the union instruction signal to each of the plurality of vehicles, the union instruction signal being a signal with which formation and separation of an array constituted by the plurality of vehicles are controlled.

With the vehicle according to the disclosure, the vehicle can project the road marking on the road from the projection unit, and therefore can improve the safety for a using person that uses the vehicle. Furthermore, with the operation management device, operation management method and computer-readable recording medium according to the disclosure, it is possible to flexibly operate the vehicle with the improved safety for the using person of the vehicle, on a general road, and to improve the convenience of the vehicle for the using person.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9A is a diagram for describing an array separation in the operation management method relevant to an array formation for vehicles according to the embodiment;

FIG. 9B is a diagram for describing an array formation in the operation management method relevant to the array formation for vehicles according to the embodiment;

DETAILED DESCRIPTION OF EMBODIMENTS

Figure 1:
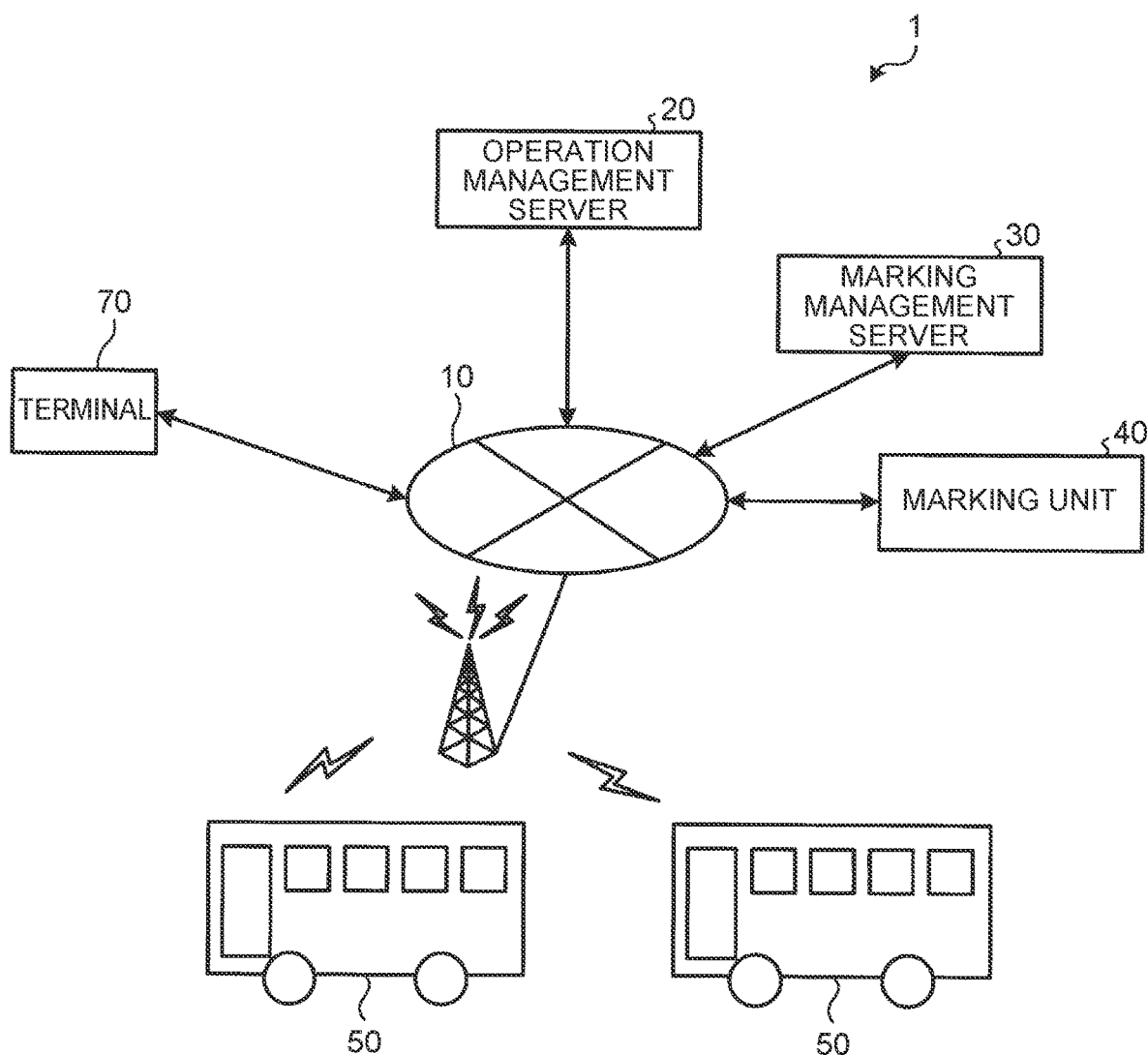
FIG. 1 is a block diagram showing an operation management system for vehicles according to an embodiment.

Hereinafter, an embodiment of the disclosure will be described with reference to the drawings. In all figures for the embodiment described below, identical or corresponding parts are denoted by identical reference characters. The disclosure is not limited to the embodiment described below.

Operation Management System

First, an operation management system to which an operation management device according to the embodiment of the disclosure can be applied will be described. FIG. 1 is a schematic view showing an operation management system 1 to which the operation management device according to the embodiment can be applied. As shown in FIG. 1, the operation management system 1 according to the embodiment includes an operation management server 20, a marking management server 30, a plurality of vehicles 50, and a user terminal device 70, which can communicate with each other through a network 10.

The network 10 is configured by an internet network, a mobile phone network and the like. The network 10 is a public communication network such as the internet, for example, and may include a wide area network (WAN), a telephone communication network for mobile phones and the like, a wireless communication network such as WiFi, and other communication networks.

Operation Management Server

The operation management server 20 as the operation management device manages traveling of each vehicle 50. In the embodiment, each vehicle 50 supplies a variety of operation information and vehicle information to the operation management server 20 at a predetermined timing. The operation information includes a variety of information relevant to the operation of the vehicle 50, as exemplified by position information, speed information and acceleration information, but is not always limited to the information. The vehicle information includes a variety of information relevant to the situation of the vehicle 50, as exemplified by a battery charge amount (SOC), a remaining fuel amount, a vehicle interior state and an exterior situation, but is not always limited to the information.

Figure 2:
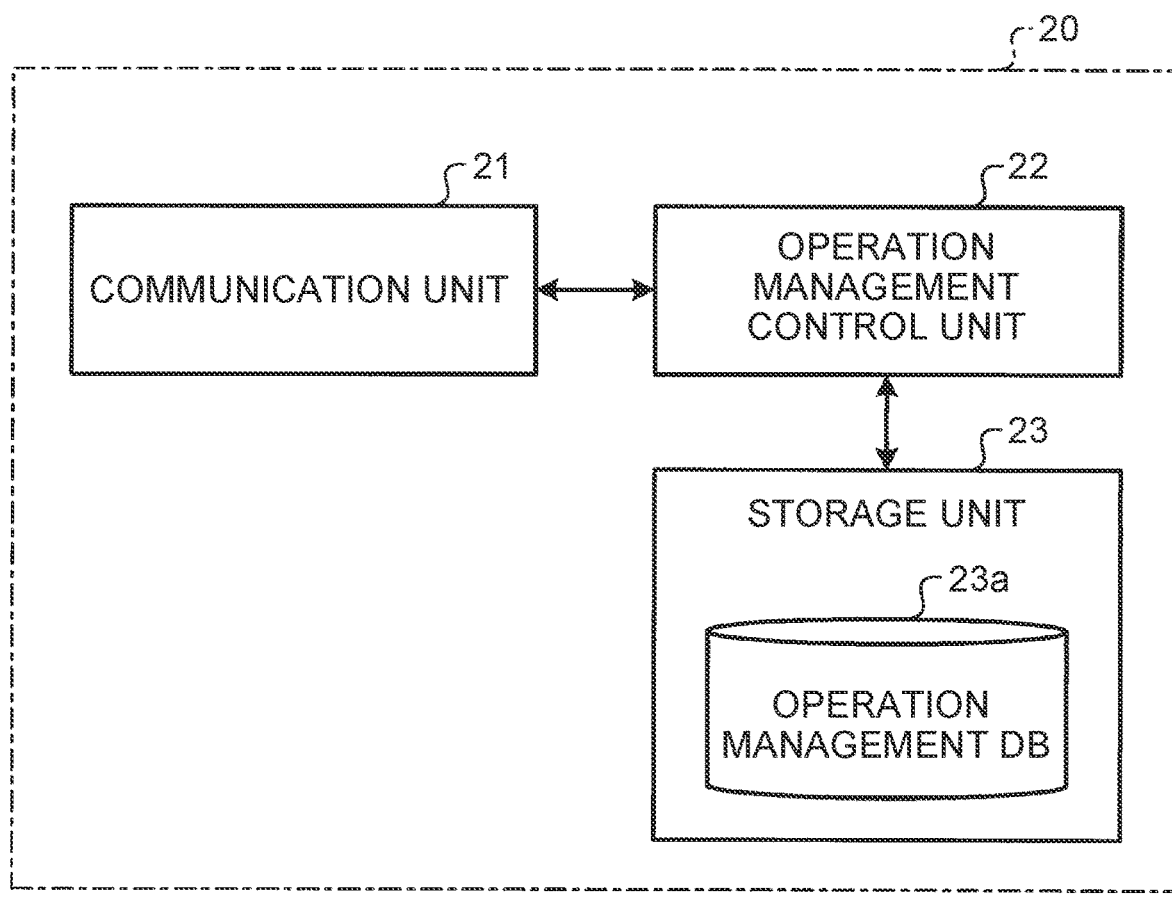
FIG. 2 is a block diagram showing a configuration of an operation management server in the operation management system for vehicles according to the embodiment.

FIG. 2 is a block diagram schematically showing a configuration of the operation management server 20. As shown in FIG. 2, the operation management server 20 has a configuration of a general computer that can communicate through the network 10. The operation management server 20 includes a communication unit 21, an operation management control unit 22, and a storage unit 23 in which an operation management database 23a is stored. For example, the communication unit 21 is a local area network (LAN) interface board or a wireless communication circuit for wireless communication. The LAN interface board or the wireless communication circuit is connected to the network 10 such as the internet that is a public communication network. By being connected to the network 10, the communication unit 21 communicates with the marking management server 30, the vehicles 50 and the user terminal device 70. For each vehicle 50, the communication unit 21 receives vehicle identification information unique to the vehicle 50 or operation situation information, and sends an instruction signal for the vehicle 50. The vehicle identification information includes information that allows each vehicle 50 to be individually identified. Further, for the user terminal device 70, in the use of the vehicle 50, the communication unit 21 sends information to a user terminal device 70 that is possessed by a user, and receives user identification information for identifying the user, or a variety of information, from the user terminal device 70.

Specifically, the operation management control unit 22 includes hardware including an unillustrated processor such as a central processing unit (CPU), a digital signal processor (DSP) and a field-programmable gate array (FPGA) and an unillustrated main storage unit such as a random access memory (RAM) and a read only memory (ROM). The storage unit 23 as a memory is constituted by a storage medium selected from an erasable programmable ROM (EPROM), a hard disk drive (HDD), a removable medium, and the like. For example, the removable medium is a universal serial bus (USB) memory, or a disc recording medium such as a compact disc (CD), a digital versatile disc (DVD) or a Blu-ray® disc (BD). In the storage unit 23, an operating system (OS), various programs, various tables, various databases and the like can be stored. The operation management control unit 22 loads a program stored in the storage unit 23, on a working area of the main storage unit, to execute the program, and controls each constituent unit through the execution of the program, so that a function according to a predetermined purpose can be realized.

The storage unit 23 includes the operation management database 23a in which a variety of data is stored such that the data can be retrieved. For example, the operation management database 23a is a relational database (RDB). A program of a database management system (DBMS) that is executed by the above-described processor manages data stored in the storage unit 23, and thereby the database (DB) described below is constructed. In the operation management database 23a, the vehicle identification information and operation information (hereinafter, also referred to as navigation data) necessary for the traveling of the vehicle 50 are stored in association with each other, such that the vehicle identification information and the operation information can be retrieved.

When the vehicle identification information is assigned to the vehicle 50, the vehicle identification information is stored in the operation management database 23a, such that the vehicle identification information can be retrieved. The vehicle identification information includes a variety of information for mutually identifying the individual vehicle 50. When the vehicle 50 sends predetermined information such as the position information and the vehicle information in the operation management server 20 together with the vehicle identification information, the operation management server 20 stores the predetermined information in the operation management database 23a, in association with the vehicle identification information, such that the predetermined information can be retrieved.

Marking Management Server

Figure 3:
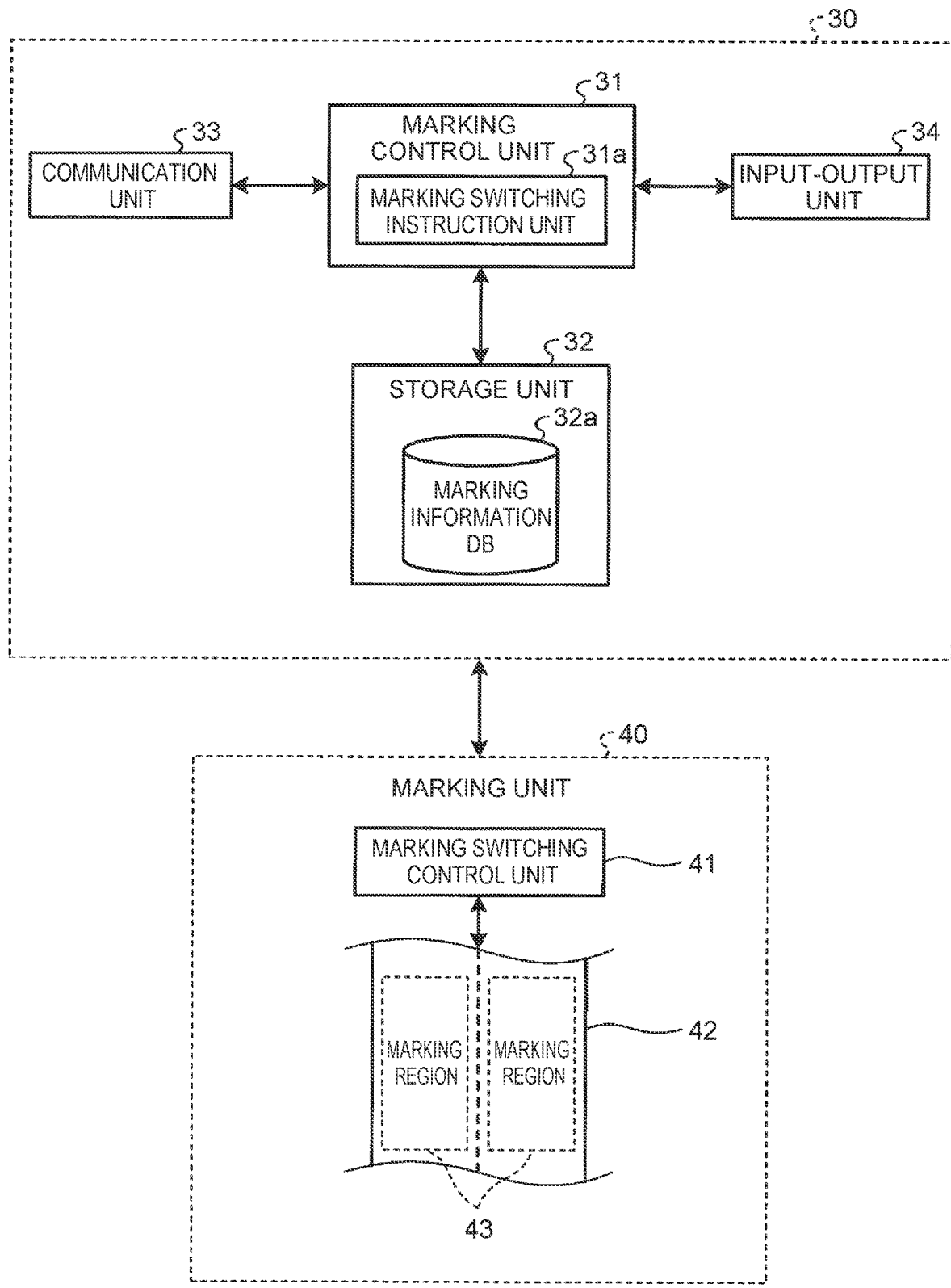
FIG. 3 is a block diagram showing a configuration of a marking management server in the operation management system for vehicles according to the embodiment.

FIG. 3 is a block diagram showing a configuration of the marking management server 30 in the operation management system 1 according to the embodiment. As shown in FIG. 3, the marking management server 30 includes a marking control unit 31, a storage unit 32, a communication unit 33 and an input-output unit 34. The marking management server 30 controls marking units 40 that are provided on roads at various places. The making unit 40 includes a marking switching control unit 41. The marking switching control unit 41 switches a road marking of a marking region 43 that is provided on a road 42. In the present specification, the road marking is a regulation (regulation marking) or instruction (instruction marking) for road traffic that appears on a road surface, and is also referred to as a road surface marking.

The marking management server 30 is a server that performs a control to switch the marking of each marking region 43 provided on roads 42 at various places, through the network 10. As a method for the appearance of the road marking on the marking region 43, various methods can be employed. Specifically, for example, a plurality of luminous bodies such as LEDs is buried in the road 42, and lighted luminous bodies and non-lighted luminous bodies are combined, so that the form of the road marking can appear on the road 42. As another specific example, a projection device is provided at a side of the road 42, and the road marking is projected to the road 42, so that the road marking can appear.

The marking control unit 31 as marking control means integrates and manages a variety of information in the marking management server 30, and further, integrally controls an action of sending a command signal to the marking unit 40. The marking control unit 31 and the storage unit 32 are physically the same as the above-described operation management control unit 22 and storage unit 23, respectively. The marking control unit 31 includes a marking switching instruction unit 31a. In the storage unit 32, a marking information database 32a is stored. In the marking information database 32a, position information and marking information including image information about the road marking are stored in association with each other, such that the position information and the marking information can be retrieved. In the case where the road 42 is newly constructed or in the case where the restriction of the vehicle 50 on the road 42 is altered, the marking information is input from the input-output unit 34 or is received from another server (not illustrated), and is stored in the marking information database 32a together with the position information, so that the marking information is updated.

The communication unit 33 as an information acquisition unit is configured to be physically the same as the above-described communication unit 21, and is connected to the network 10, to communicate with at least the operation management server 20 and the marking unit 40. As necessary, the communication unit 33 may be configured to be capable of communicating with the vehicle 50 and the user terminal device 70. The communication unit 33 sends and receives at least part of the above-described vehicle information and operation information, for the operation management server 20.

The input-output unit 34 is constituted by a touch panel display, a speaker-microphone and the like. The input-output unit 34 as output means is configured to be capable of giving notice of predetermined information to the exterior, in accordance with control from the marking control unit 31, by displaying a character, a figure and the like on a screen of the touch panel display or by outputting a voice from the speaker-microphone. Further, the input-output unit 34 as input means is configured to input predetermined information to the marking control unit 31 when the user or the like operates the touch panel display or makes a voice to the speaker-microphone.

Vehicle

Figure 4:
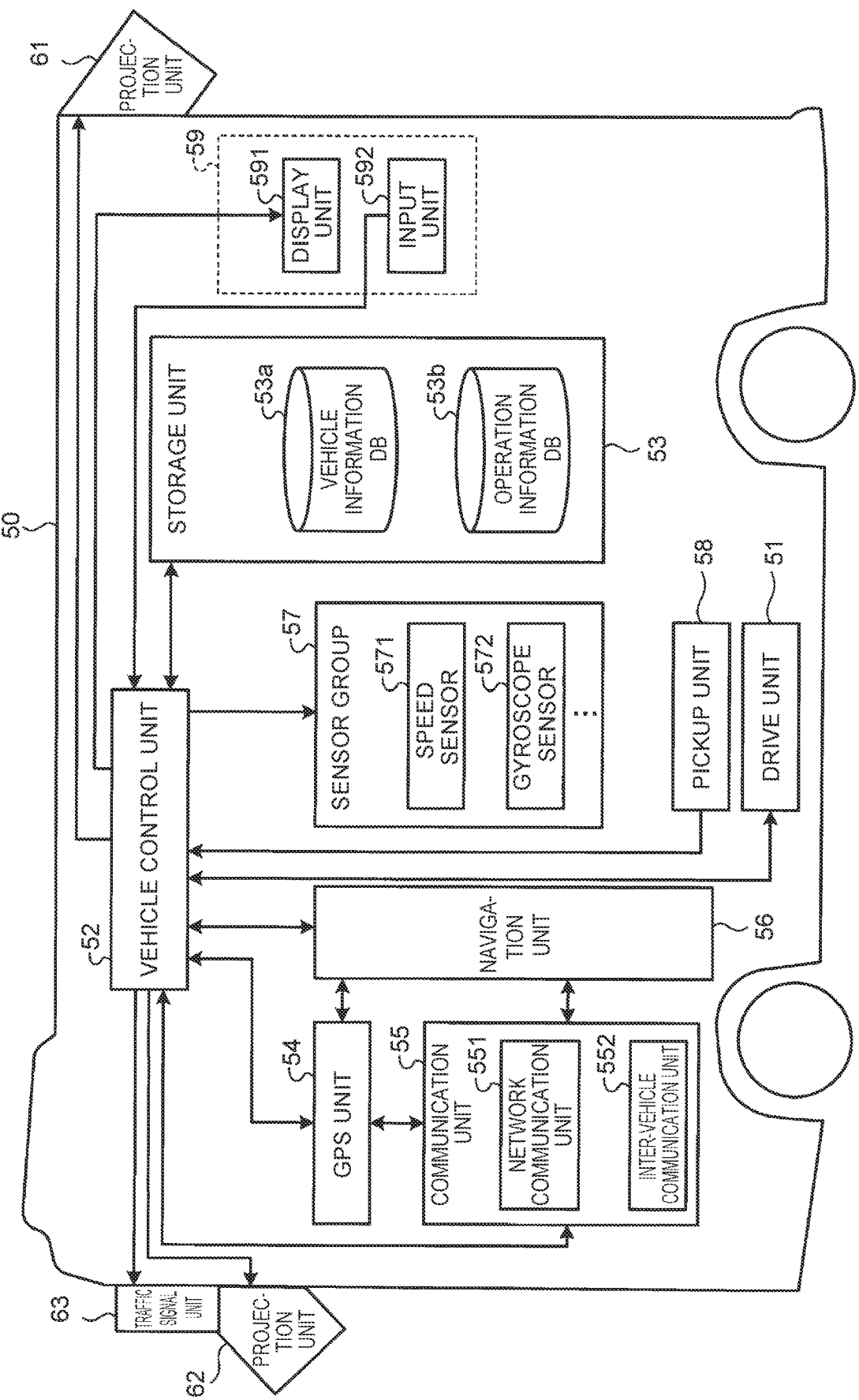
FIG. 4 is a block diagram showing a configuration of a vehicle in the operation management system for vehicles according to the embodiment.
Figure 5A:
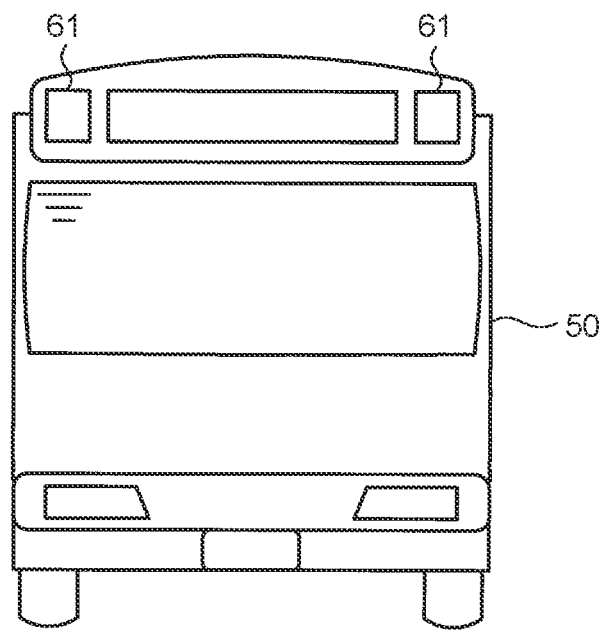
FIG. 5A is an elevation view of the vehicle according to the embodiment.
Figure 5B:
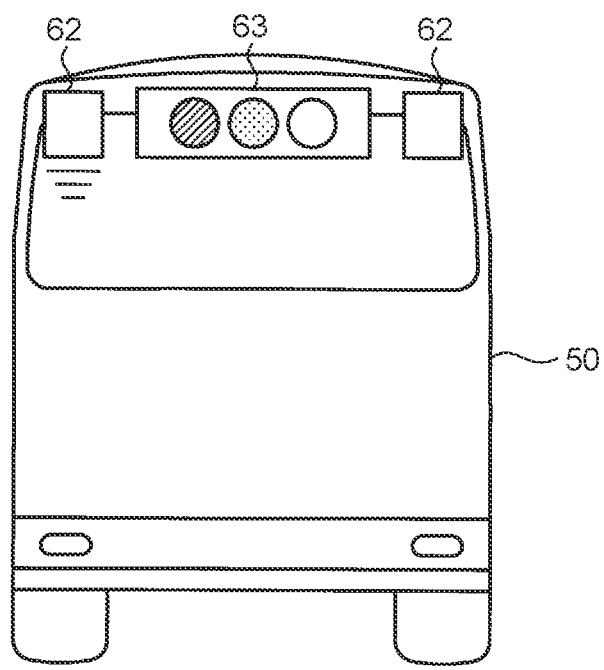
FIG. 5B is a rear view of the vehicle according to the embodiment.

The vehicle 50 as a movable body is a vehicle that travels by driver's driving, or an autonomous vehicle that is configured to be capable of performing autonomous traveling in accordance with a given operation command. The vehicle 50 has various functions necessary for an automatic follow-up traveling that allows a conventionally known array traveling. FIG. 4 is a block diagram schematically showing a configuration of the vehicle 50. FIG. 5A is an elevation view of the vehicle 50 as viewed from a forward side, and FIG. 5B is a rear view of the vehicle 50 as viewed from a rearward side.

As shown in FIG. 4, the vehicle 50 includes a drive unit 51 for traveling. The drive unit 51 is a conventionally known drive unit necessary for the traveling of the vehicle 50. Specifically, the vehicle 50 includes an engine as a drive source, and the engine is configured to be capable of generating electricity with driving by combustion of fuel, using an electric motor or the like. By the generated electric power, a rechargeable battery is charged. Further, the vehicle 50 includes a drive transmission mechanism that transmits drive power of the engine, drive wheels for traveling, and the like.

Further, the vehicle 50 includes a vehicle control unit 52, a storage unit 53, a global positioning system (GPS) unit 54, a communication unit 55, a navigation unit 56, a sensor group 57, a pickup unit 58, and an operation terminal 59. The communication unit 55 includes a network communication unit 551 and an inter-vehicle communication unit 552. The sensor group 57 includes a speed sensor 571 and a gyroscope sensor 572. The operation terminal 59 includes a display unit 591 and an input unit 592. On the outside of the vehicle 50, projection units 61, 62 and a traffic signal unit 63 are provided.

The vehicle control unit 52 and the storage unit 53 are physically the same as the above-described operation management control unit 22 and storage unit 23, respectively. The vehicle control unit 52 integrally controls actions of various constituent elements that are mounted on the vehicle 50. Specifically, the vehicle control unit 52 is constituted by an electronic control unit (ECU) that controls constituent units of the vehicle 50, as exemplified by an engine, an electric motor and a steering device, and is configured to be capable of controlling the vehicle speed and steering angle of the vehicle 50. The vehicle control unit 52 controls the vehicle speed, by adjusting the throttle opening degree of the engine and the braking force of a brake. The vehicle control unit 52 steers the vehicle 50, by adjusting the steering angle of a wheel that rotates at the time of traveling.

The vehicle control unit 52 is configured to be capable of exchanging predetermined signals, with the GPS unit 54, the communication unit 55, the navigation unit 56, the sensor group 57, the pickup unit 58, the display unit 591 and the input unit 592. The vehicle control unit 52 acquires a traveling route of the vehicle 50 and acquires a variety of information about the vehicle 50, based on output signals that are output from the speed sensor 571 and gyroscope sensor 572 of the sensor group 57, the GPS unit 54, the navigation unit 56 and the like.

The storage unit 53 includes a vehicle information database 53a and an operation information database 53b. In the vehicle information database 53a, a variety of information including the battery charge amount, the remaining fuel amount, the current position and the like is stored in an updatable manner. In the operation information database 53b, a variety of data including operation information provided from the operation management server 20 is stored in an updatable manner. In the operation information database 53b, a variety of information necessary for the automatic follow-up traveling, as exemplified by map information, is stored in a readable manner. For example, the map information includes node data indicating the position of a node such as an intersection, interchange or junction set on a road on which the vehicle 50 travels. Further, the map information includes form interpolation data indicating, for example, the position of a form interpolation point for specifying the form of a road section between nodes, link data indicating a variety of information such as necessary time for the road section and a section length, and the like.

The GPS unit 54 receives electric waves from GPS satellites (not illustrated), and outputs information for deriving the current position of the vehicle 50, to the vehicle control unit 52, through a predetermined interface (not illustrated). The detected position is stored in the vehicle information database 53a, as the position information in the vehicle information, such that the position can be retrieved. Together with the traveling route, the form of a traveling section may be acquired based on the node data and the link data in the map information. Based on the information acquired from the GPS unit 54, the vehicle control unit 52 specifies a position that matches the traveling route of the vehicle 50, as the traveling section, and specifies the current position of the vehicle 50. As a method for detecting the position of the vehicle 50, a method of combining LiDAR (Light Detection and Ranging or Laser Imaging Detection and Ranging) and a three-dimensional digital map may be employed.

The communication unit 55 is constituted, for example, by a data communication module (DCM) that communicates with at least the operation management server 20 by the wireless communication through the network 10. The network communication unit 551 of the communication unit 55 is connected to the network 10 in the exterior, by wireless communication or the like. By the network communication unit 551, the vehicle 50 is configured to be capable of exchanging a variety of information with the operation management server 20 and the user terminal device 70. The inter-vehicle communication unit 552 of the communication unit 55 is configured to be capable of being connected to an inter-vehicle communication unit 552 of another vehicle 50 in the exterior, by wireless communication or the like. The vehicle control unit 52 communicates with another vehicle 50, by controlling the inter-vehicle communication unit 552.

The navigation unit 56 exchanges data such as the map information and traveling route information, a navigation program and the like, with the vehicle control unit 52. Thereby, the vehicle control unit 52 causes the vehicle 50 to travel, by supplying various command signals to each constituent element that constitutes the vehicle 50. The navigation unit 56 may include a control unit and a recording medium, and for example, may include a CPU, a RAM, a ROM and the like.

The speed sensor 571 of the sensor group 57 outputs a signal corresponding to the rotation speed of a wheel that drives the vehicle 50 at the time of the traveling of the vehicle 50, to the vehicle control unit 52. The vehicle control unit 52 acquires the vehicle speed of the vehicle 50, by acquiring the signal supplied from the speed sensor 571. The gyroscope sensor 572 of the sensor group 57 detects the angular acceleration of turning of the vehicle 50 in a horizontal plane, and outputs a signal corresponding to the orientation of the vehicle 50. The vehicle control unit 52 acquires the movement direction of the vehicle 50, by acquiring the signal supplied from the gyroscope sensor 572. The sensor group 57 may further include a vehicle cabin sensor that can detect various situations in a vehicle cabin, a pickup device such as, for example, a pickup camera, and the like.

The pickup unit 58 is constituted by a pickup device that images the periphery of the vehicle 50. The pickup unit 58 supplies data about the picked peripheral image, to the vehicle control unit 52. The vehicle control unit 52 performs image recognition of the peripheral image, and acquires the own vehicle, a different vehicle, and a relative position relation between the own vehicle and the different vehicle.

The operation terminal 59 is an interface unit for receiving an operation from a driver and guiding the driver along a scheduled traveling route. The operation terminal 59 includes at least the display unit 591 and the input unit 592. The display unit 591 and the input unit 592 may be integrated, and may be constituted by a touch panel display or the like. The display unit 591 may further include an output unit for an output sound, as exemplified by a speaker. The scheduled traveling route is a route constituted by a plurality of constituent road sections as road sections on which the vehicle 50 is scheduled to travel. The vehicle control unit 52 executes the navigation program in the navigation unit 56, and thereby displays a map on which the scheduled traveling route is superimposed, on the display unit 591. As the navigation program, a conventionally known navigation program can be employed.

As shown in FIG. 5A, the projection units 61 are provided at upper portions on a front side of the vehicle 50. On the other hands, as shown in FIG. 5B, the projection units 62 are provided at upper portions on a rear side of the vehicle 50. Each of the projection units 61, 62 is constituted, for example, by an image projector that includes a conventionally known LED or the like as a light source. Each of the projection units 61, 62 is configured to be capable of projecting a crosswalk, a road marking or the like on the road 42 by control from the vehicle control unit 52.

As shown in FIG. 5B, the traffic signal unit 63 is provided at an upper portion on the rear side of the vehicle 50. The traffic signal unit 63 is a device that indicates a traffic signal for movement permission or stop instruction. The traffic signal unit 63 is configured similarly to a signal lamp device that has lamp colors arrayed in an order of green (or blue), yellow and red from the left and that selectively lights one of the lamp colors when appropriate. The traffic signal unit 63 is configured to selectively light a green signal, a yellow signal or a red signal by control from the vehicle control unit 52, when appropriate. The traffic signal unit 63 may be a signal lamp device having two colors of green and red.

User Terminal Device

Figure 6:
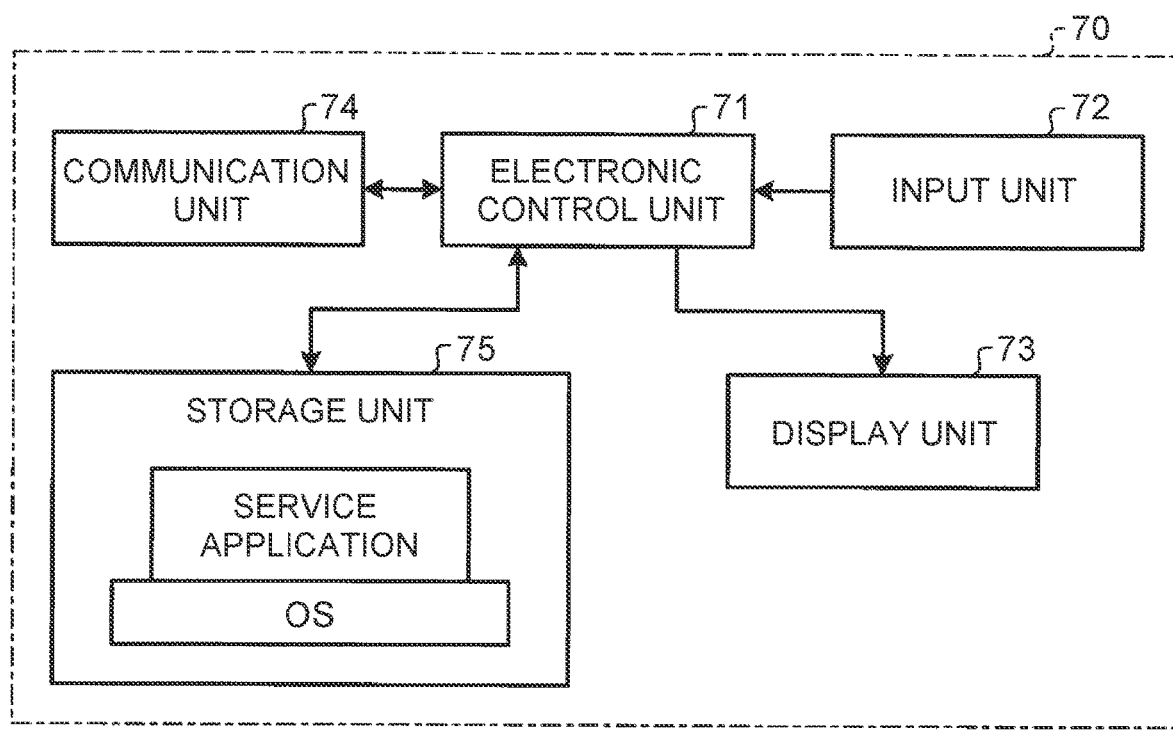
FIG. 6 is a block diagram showing a configuration of a user terminal device in the operation management system for vehicles according to the embodiment.

The user terminal device 70 as a used terminal is operated by the user. For example, through calls using a variety of data and voices with a communication application, the user terminal device 70 can send a variety of information such as user information including the user identification information and user selection information, to the operation management server 20. FIG. 6 is a block diagram schematically showing a configuration of the user terminal device 70.

As shown in FIG. 6, the user terminal device 70 includes an electronic control unit 71, an input unit 72, a display unit 73, a communication unit 74 and a storage unit 75, which are connected so as to be capable of communicating with each other. The electronic control unit 71, the communication unit 74 and the storage unit 75 are physically the same as the above-described operation management control unit 22, communication unit 21 and storage unit 23, respectively. The electronic control unit 71 executes various application programs, and thereby integrally controls actions of the input unit 72, the display unit 73, the communication unit 74 and the storage unit 75. The communication unit 74 exchanges a variety of information such as the user identification information, the user selection information, operation plan information and voice data, with external servers such as the operation management server 20, through the network 10. The storage unit 75 is configured such that the user identification information can be stored.

The input unit 72 is constituted, for example, by a keyboard, a touch panel keyboard that is incorporated within the display unit 73 and that detects a touch operation to a display panel, a voice input device that allows a call to the exterior, or the like. The display unit 73 is constituted, for example, by an organic EL panel, a liquid crystal display panel or the like, and gives information to the exterior, by displaying a character, a figure or the like on the display panel.

Specifically, as the above-described user terminal device 70, a mobile phone such as a smartphone, a tablet information terminal, a personal computer or the like can be employed. For example, a desktop personal computer provided at home or the like, or a fixed-line phone provided at home or the like can be also used.

Operation Management Method

Figure 7:
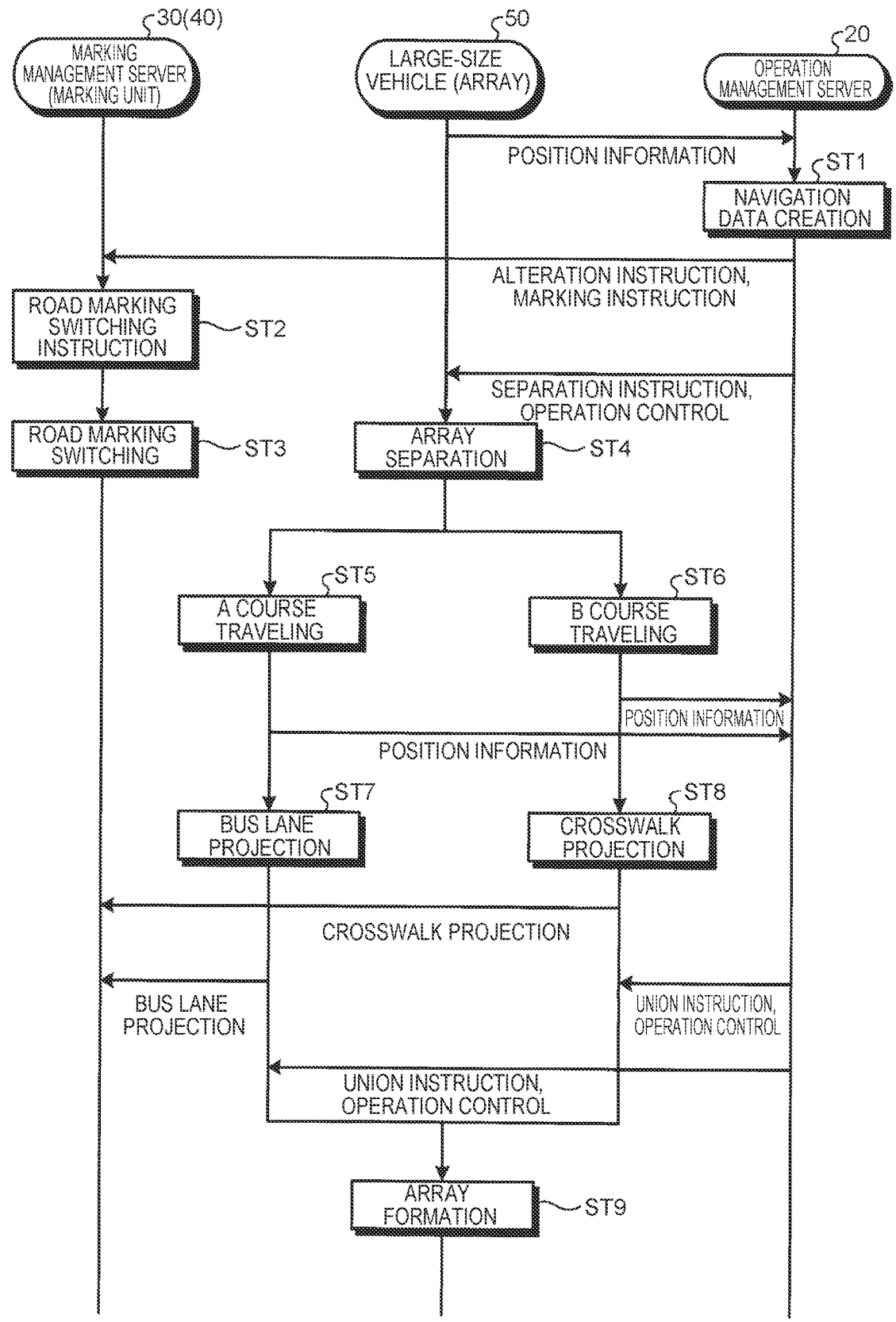
FIG. 7 is a flowchart for describing an operation management method for vehicles according to the embodiment.

Next, an operation management method that is executed to the vehicle 50 by the operation management server 20 and the marking management server 30 in the above-described operation management system 1 will be described. FIG. 7 is a flowchart for describing the operation management method according to the embodiment. FIG. 8, FIG. 9A, FIG. 9B, FIG. 10 and FIG. 11 each are diagrams for specific examples of the operation management method according to the embodiment. In the operation management method according to the embodiment, a case where three vehicles 50A, 50B, 50C, which are buses, perform the array traveling will be described as an example. In the following description, sending and receiving of information are performed through the network 10, but descriptions about this point will be omitted.

As shown in FIG. 7, the vehicles 50A, 50B, 50C, which are large-size vehicles such as buses, periodically send the vehicle identification information and information including the position information, to the operation management server 20. The vehicles 50A, 50B, 50C may send the vehicle information together. After receiving the position information, the operation management server 20 stores the vehicle identification information and the information including the position information in the operation management database 23a of the storage unit 23, in association with each other.

Subsequently, in step ST1, the operation management control unit 22 of the operation management server 20 generates the navigation data, by setting an operation plan including a departure hour, an arrival hour, a traveling time and a scheduled traveling route relevant to the operation of each of the vehicles 50A, 50B, 50C. The operation management control unit 22 stores the generated navigation data in the operation management database 23a of the storage unit 23.

Next, the operation management server 20 reads the generated navigation data from the storage unit 23. Based on the navigation data, the operation management server 20 sends information (marking information) relevant to an alteration instruction signal for the road marking along the scheduled traveling route of each of the vehicles 50A, 50B, 50C and the road marking after the alteration, to the marking management server 30. The marking control unit 31 of the marking management server 30 stores the received marking information, in the marking information database 32a of the storage unit 32.

Thereafter, in step ST2, the marking switching instruction unit 31a controls the marking unit 40 based on the alteration instruction signal. That is, the marking switching instruction unit 31a reads the marking information from the marking information database 32a, and sends an instruction signal for switching to the marking information, to the marking unit 40. Subsequently, in step ST3, based on the received instruction signal, the marking switching control unit 41 switches the road marking on the marking region 43, to the road marking in the received instruction. Thereby, the road marking in the instruction from the marking management server 30 appears on the marking region 43 of the road 42.

Figure 8:
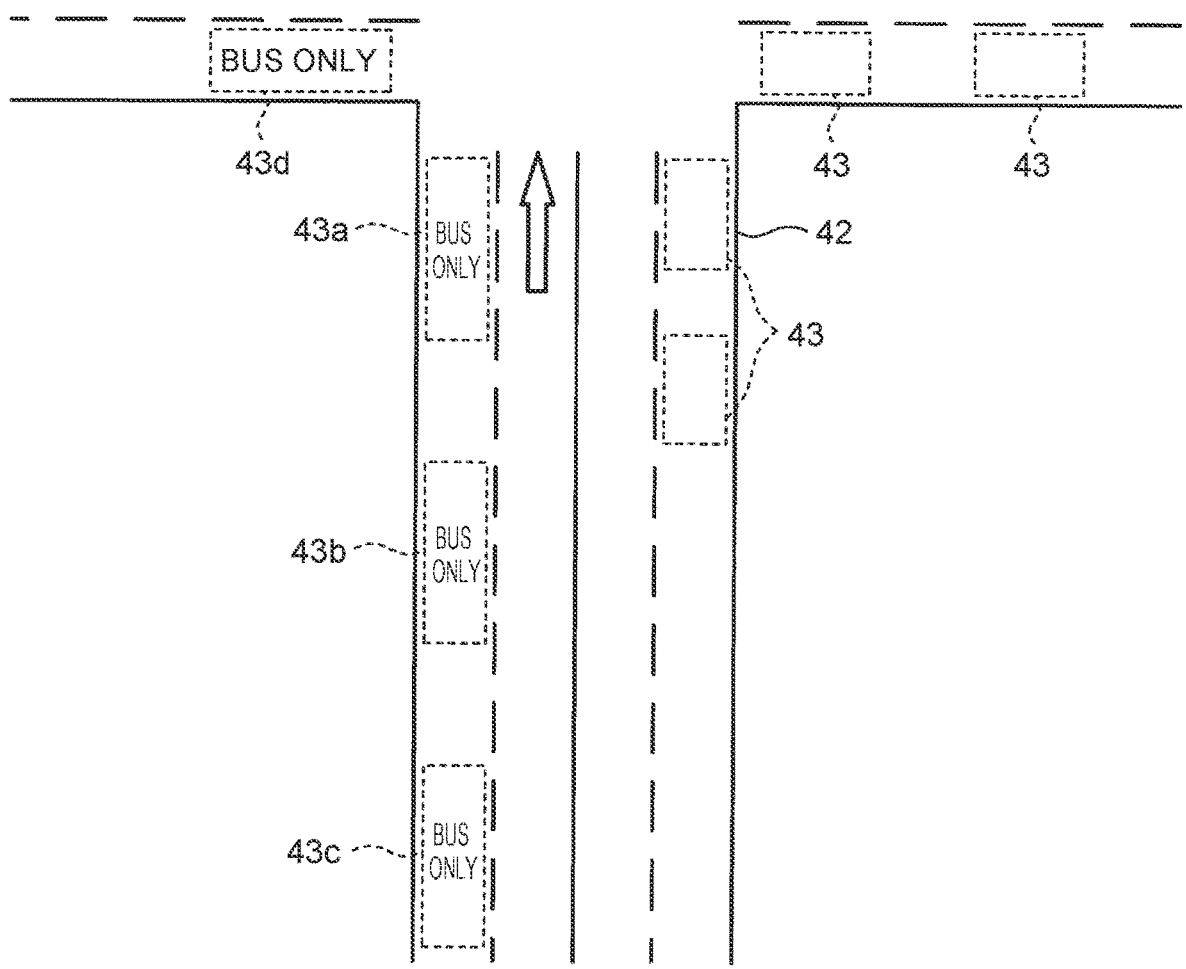
FIG. 8 is a diagram for describing a marking method for a marking unit by the operation management method according to the embodiment.

In the embodiment, for example, as shown in FIG. 8, a road marking "BUS ONLY" appears on the marking region 43 of the road 42, based on the scheduled traveling route of each of the vehicles 50A, 50B, 50C, which are buses. In the example shown in FIG. 8, the road marking "BUS ONLY" appears on marking regions 43a, 43b, 43c, 43d. Thereby, a bus lane on which only buses can travel appears on the road 42. On the other hand, for marking regions 43 that are not on the scheduled traveling route of the buses, the road marking "BUS ONLY" does not appear on a marking region 43e provided at a position to which the buses go straight beyond the intersection and a marking region 43f provided at a position to which the buses turn right. In this case, on roads on which the marking regions 43e, 43f are provided, general vehicles can also travel.

Next, as shown in FIG. 7, the operation management control unit 22 of the operation management server 20 reads the navigation data from the operation management database 23a, and performs the operation control for the vehicles 50A, 50B, 50C. Specifically, as shown in FIG. 9A, the vehicles 50A, 50B, 50C perform an array traveling in which the vehicle 50A is a lead vehicle and the vehicles 50B, 50C follow the vehicle 50A. Thereafter, in step ST4, the operation management control unit 22 sends, for example, a separation instruction signal for separating the vehicles 50A, 50B and the vehicle 50C, based on the navigation data. After receiving the separation instruction signal, the vehicles 50A, 50B, 50C communicate with each other through the inter-vehicle communication units 552, and execute a separation process of separating the vehicles 50A, 50B and the vehicle 50C. Thereby, as shown in a lower portion of FIG. 9A, the vehicles 50A, 50B and the vehicle 50C travel along different traveling routes from each other. In this example, in step ST5, the vehicles 50A, 50B travel along an A course, and in step ST6, the vehicle 50C travels along a B course. The vehicles 50A, 50B, 50C periodically send the information including the position information, to the operation management server 20, even while the vehicles 50A, 50B, 50C are traveling along the A course and the B course. As shown in an upper portion of FIG. 9A, the vehicle 50A and the vehicle 50B may be further separated by repeat of step ST4.

Figure 10:
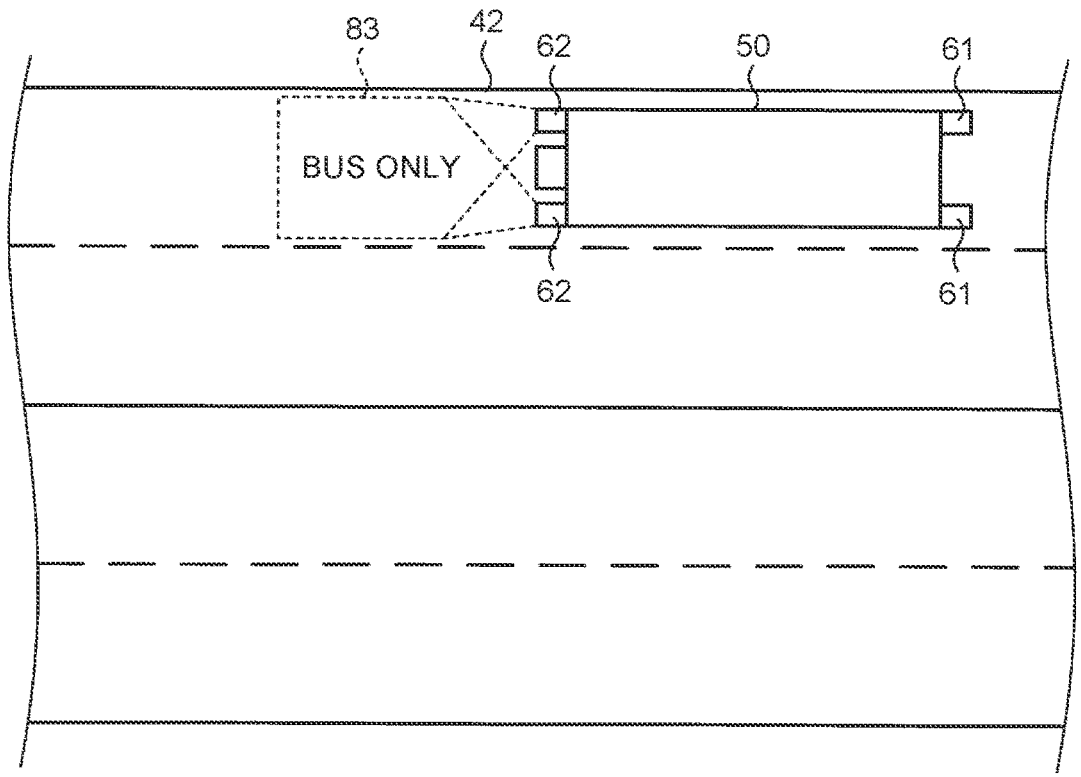
FIG. 10 is a diagram showing a projection method for a bus lane by the vehicle according to the embodiment.

Next, when the vehicles 50A, 50B traveling along the A course gets close to or arrives at a predetermined destination or stop place such as a bus stop, the process transition to step ST7. In step ST7, as shown in FIG. 10, the vehicle 50 (the vehicles 50A, 50B) projects the road marking on the road 42 from the projection units 62 on the rear side of the vehicle 50, by control from the vehicle control unit 52. In the example shown in FIG. 10, the vehicle 50 projects a road marking "BUS ONLY" (a bus-only marking 83) indicating that the lane is a bus lane. In FIG. 10, only one vehicle 50 is illustrated. Thereby, the driver of another general vehicle (not illustrated) that is traveling behind the vehicle 50, which is a bus, easily recognizes that the lane on which the general vehicle is traveling is a bus lane, and therefore, it is possible to reduce the possibility that the vehicle 50 (the vehicles 50A, 50B) is caught in a congestion or the like. That is, by projecting the road marking for the traveling of a particular vehicle from the vehicle 50, it is possible to remind the driver of another general vehicle. The road marking that is projected by the projection units 62 is not limited to "BUS ONLY" if the road marking is a road marking for the traveling of a particular vehicle, and for example, may be another road marking such as "BUS PRIORITY". Further, the road marking that is projected by the projection units 62 may be another road marking such as "DO NOT GO STRAIGHT" or "DO NOT ENTER".

Figure 11:
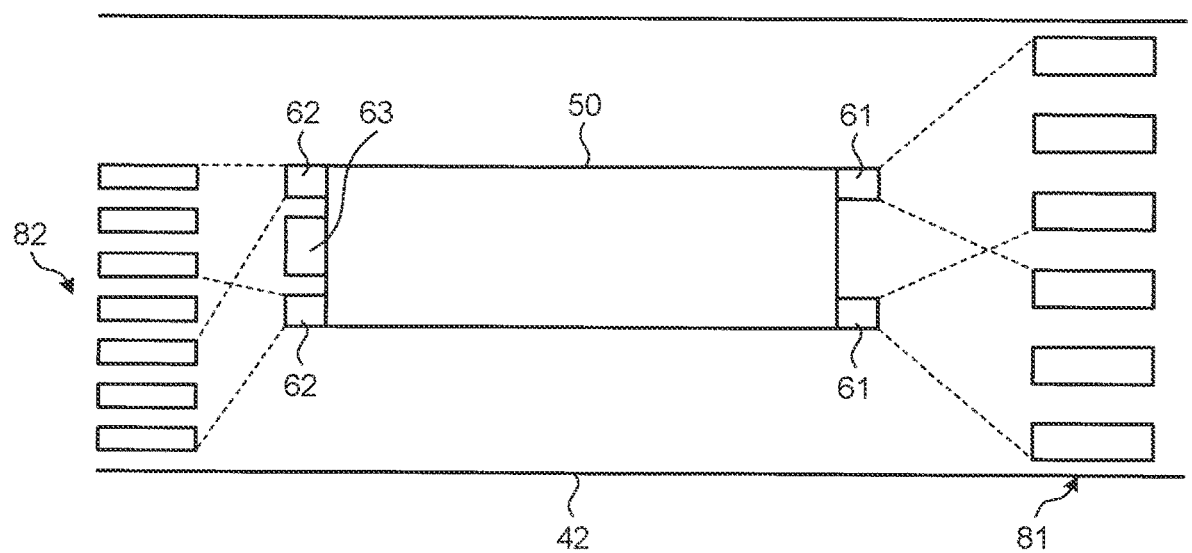
FIG. 11 is a diagram showing a projection method for a crosswalk by the vehicle according to the embodiment.

On the other hand, when the vehicle 50C traveling along the B course gets close to or arrives at a predetermined destination or stop place such as a bus stop, the process transitions to step ST8. In step ST8, as shown in FIG. 11, the vehicle 50 (the vehicle 50C) projects the road marking on the road 42 from at least one of the projection units 61 on the front side of the vehicle 50 and the projection units 62 on the rear side of the vehicle 50, by control from the vehicle control unit 52. In the example shown in FIG. 11, the projection units 61 on the front side project a crosswalk 81 over the whole width of the road 42, and the projection units 62 on the rear side project a crosswalk 82 from a road side of the road 42 to a width-directional halfway position of the road 42. Thereby, the driver of another general vehicle (not illustrated) that is traveling behind the vehicle 50, which is a bus, easily recognizes that there are the crosswalks 81, 82 in front of and behind the vehicle 50. That is, by the projection of the crosswalks 81, 82 from the vehicle 50, it is possible to remind the driver of the other general vehicle. Thereby, even in the case where a using person having got off the vehicle 50 crosses the road 42 in front of or behind the vehicle 50, the possibility of a collision accident or the like with a following vehicle is significantly reduced.

Furthermore, while the vehicle 50 (the vehicles 50A to 50C) is projecting the road marking on the road 42, the red signal, yellow signal or green signal of the traffic signal unit 63 may be lighted by control from the vehicle control unit 52. In this case, for example, while a pedestrian having got off the vehicle 50, or the like is crossing at the crosswalk 81, 82 projected on the road 42, the red signal is lighted on the traffic signal unit 63. Thereby, the driver of another general vehicle (not illustrated) that is traveling behind the vehicle 50, which is a bus, easily recognizes that the pedestrian is crossing at the crosswalk 81, 82 in front of or behind the vehicle 50, and it is possible to further reduce the possibility of a collision accident or the like with a following vehicle.

Next, as shown in FIG. 7, the operation management server 20 sends a union instruction signal for instruction of the execution of an array formation by joining, to the vehicles 50A, 50B, 50C. Thereby, the process transitions to step ST9. In step ST9, as shown in a lower portion of FIG. 9B, when the vehicles 50A, 50B and the vehicle 50C come in a close range, the vehicles 50A, 50B and the vehicle 50C communicate with each other through the inter-vehicle communication units 552, and thereby, an array recognition process for a mutual recognition is executed. For example, to the following vehicle 50C, information allowing the vehicle 50C to automatically follow up the vehicles 50A, 50B is set or given. The vehicle 50C is recognized as a following vehicle behind the vehicle 50B, by the vehicles 50A, 50B. Thereafter, as arrayed vehicles, the vehicles 50A, 50B, 50C travel along the scheduled traveling route based on the navigation data. In the case where the vehicle 50A and the vehicle 50B are separated, the array recognition process is executed between the vehicle 50A and the vehicle 50B, and the array formation is performed, as shown in an upper portion of FIG. 9B. Various conventionally known methods can be employed for the array recognition process and the array formation among the vehicles 50A, 50B, 50C. Thus, the operation management according to the embodiment is executed.

Modification

Figure 12A:
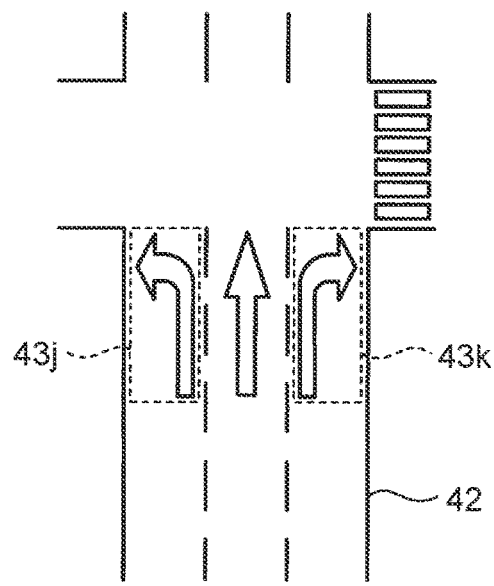
FIG. 12A is a diagram for describing a switching method for a road marking according to a modification of the embodiment.
Figure 12B:
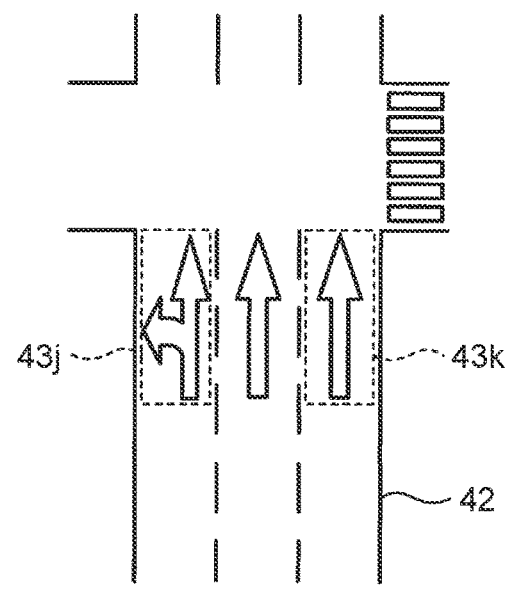
FIG. 12B is a diagram for describing a switching method for the road marking according to the modification of the embodiment.

Next, a modification of the marking method by the marking unit according to the above-described embodiment will be described. Each of FIG. 12A and FIG. 12B is a diagram showing an example of the switching of the road marking on the marking region 43 of the marking unit 40 according to the modification. As shown in FIG. 12A, for example, on a three-lane road 42, a road marking for left-turn instruction appears on a marking region 43*j* of the left lane, a road marking for straight-travel instruction appears on the center lane, and a road marking for right-turn instruction appears on a marking region 43*k* of the right lane. The road marking for straight-travel instruction on the center lane may be an ordinary road marking for which paint is used.

The marking switching instruction unit 31*a* of the marking management server 30 sends a switching instruction signal to the marking switching control unit 41 of the marking unit 40, for example, depending on whether the current day is a weekday or a holiday, a day of week or a time of day. The marking switching instruction unit 31*a* may further send the marking information. After receiving the instruction signal, the marking switching control unit 41 switches the road marking by controlling the marking regions 43*j*, 43*k*.

For example, as shown in FIG. 12B, the road marking to appear on the marking region 43*j* of the left lane is switched from the road marking for left-turn instruction to a road marking for left-turn or straight-travel. Thereby, in a time of day when the congestion easily occurs, it is possible to increase the number of lanes on which vehicles can go straight from one to two, and therefore it is possible to restrain the occurrence of the congestion or alleviate the congestion.

Further, the road marking to appear on the marking region 43*k* of the right lane is switched from the road marking for right-turn instruction to the road marking for straight-travel instruction. Thereby, for example, in a time of day when many pedestrians such as little children cross at a crosswalk on the right side of FIG. 12B, it is possible to prohibit the right turn, and therefore it is possible to restrain the occurrence of an accidental contact or the like with a pedestrian such as a little child crossing at the crosswalk due to the right turn of the vehicle 50. Moreover, it is possible to further increase the number of lanes on which vehicles can go straight by one, and therefore it is possible to further restrain the occurrence of the congestion or further alleviate the congestion.

With the above-described embodiment, the vehicle 50 can project the crosswalks 81, 82 and the road markings on the road 42 from the projection units 61, 62, as markings that can be recognized by the driver of another following vehicle, and therefore it is possible to improve the safety for a using person that uses the vehicle. Furthermore, it is possible to flexibly operate the vehicle with the improved safety for the using person, on a general road, based on the navigation data in the operation management server 20, and therefore it is possible to improve the convenience of the vehicle for the using person.

The embodiment of the disclosure has been specifically described above. The disclosure is not limited to the above-described embodiment, and various modifications can be made based on the technical idea of the disclosure. For example, numerical values mentioned in the above-described embodiment are just examples, and different numerical values from the mentioned numerical values may be used as necessary.

Recording Medium

In the above-described embodiment, the program allowing the execution of the operation management method can be recorded in a recording medium that can be read by a computer or another machine or device (hereinafter, referred to as a computer or the like). The computer or the like reads and executes the program in the recording medium, and thereby the computer or the like functions as the operation management server 20. The recording medium that can be read by the computer or the like is a non-transitory recording medium that accumulates information such as data and programs by electric, magnetic, optical, mechanical or chemical action and that can be read by the computer or the like. Among the recording media, examples of recording media that can be detached from the computer or the like include a flexible disk, a magneto-optical disk, a CD-ROM, a CD-R/W, a DVD, a BD, a DAT, a magnetic tape, and a memory card such as a flash memory. Further, examples of recording media that are fixed in the computer or the like include a hard disk and a ROM. Furthermore, an SSD can be used as a recording medium that can be detached from the computer or the like, and can be used as a recording medium that is fixed in the computer or the like.

Other Embodiments

In the operation management server 20, the marking management server 30, the marking unit 40, the vehicle 50 and the user terminal device 70 according to the embodiment, the "unit" can be replaced with "circuit" or the like. For example, the communication unit can be replaced with a communication circuit.

The program that is executed by the operation management device according to the embodiment is file data in an installable format or an executable format, and is provided while being recorded in a computer-readable recording medium such as a CD-ROM, a flexible disk (FD), a CD-R, a digital versatile disk (DVD), a USB medium and a flash memory.

Further, the program that is executed by the operation management device according to the embodiment may be stored in a computer connected to a network such as the internet, and may be provided by download via the network.

In the description of the flowchart in the present specification, the anteroposterior relation of the processes of the steps has been clearly shown with use of expressions such as "first", "thereafter" and "subsequently". However, the order of processes necessary to carry out the embodiment is not uniquely decided by the expressions. That is, the order of the processes in the flowchart described in the present specification can be modified as long as there is no inconsistency.

Other effects and modifications can be easily derived by a person skilled in the art. A wider aspect of the disclosure is not limited to particular details and typical embodiments expressed and described above. Accordingly, various modifications can be made without departing from the spirit and scope of the all-inclusive concept of the disclosure that is defined by the attached claims and equivalents of the claims.

What is claimed is:

1. A vehicle configured to travel on a road, the vehicle comprising:
   a control unit that controls each unit constituting the vehicle; and
   an image projector configured to project a road marking on the road by control from the control unit, the road marking being lane information indicating designated travel of a particular type of vehicle.

2. The vehicle according to claim 1, further comprising a traffic signal lamp that selectively outputs a color of at least two different colors by control from the control unit.

3. An operation management device comprising a memory, and a processor including hardware, the processor being configured to:

acquire position information from each of a plurality of vehicles, the plurality of vehicles including the vehicle according to claim 1; and output a union instruction signal based on the acquired position information, and send the union instruction signal to each of the plurality of vehicles, the union instruction signal being a signal to control a formation and separation of an array constituted by the plurality of vehicles.

4. An operation management method that is executed by an operation management device, the operation management method comprising:

acquiring position information from each of a plurality of vehicles, the plurality of vehicles including the vehicle according to claim 1;

reading the acquired position information from a memory; and sending a union instruction signal to each of the plurality of vehicles, the union instruction signal being a signal to control a formation and separation of an array constituted by the plurality of vehicles.

5. A non-transitory computer-readable storage medium storing a computer executable program that, when executed, causes an operation management device to execute:

acquiring position information from each of a plurality of vehicles, the plurality of vehicles including the vehicle according to claim 1;

reading the acquired position information from a memory; and sending a union instruction signal to each of the plurality of vehicles, the union instruction signal being a signal with which formation and separation of an array constituted by the plurality of vehicles are controlled.

6. The vehicle according to claim 1, wherein the road marking is a bus lane or a bus priority lane.

7. The vehicle according to claim 1, wherein the road marking is a left-turn instruction, a straight-travel instruction, or a right-turn instruction.

* * * * *